United States Patent

[11] 3,585,605

[72] Inventors Peter A. E. Gardner
Winchester;
Michael H. Hallett, Chandlers Ford; Roger J. Llewelyn, Winchester; Peter J. Titman, Winchester, all of, England

[21] Appl. No. 828,503
[22] Filed May 28, 1969
[45] Patented June 15, 1971
[73] Assignee International Business Machines Corporation
Armonk, N.Y.
[32] Priority July 4, 1968
[33] Great Britain
[31] 32075/68

[54] ASSOCIATIVE MEMORY DATA PROCESSOR
15 Claims, 5 Drawing Figs.

[52] U.S. Cl. .......... 340/172.5
[51] Int. Cl. .......... G11c 15/00
[50] Field of Search .......... 340/172.5; 235/157

[56] References Cited
UNITED STATES PATENTS

| | | | |
|---|---|---|---|
| 3,199,085 | 8/1965 | Rhodes et al. | 340/172.5 |
| 3,328,767 | 6/1967 | Ottaway | 340/172.5 |
| RE.26,171 | 3/1967 | Falkoff | 340/172.5 |
| 3,290,656 | 12/1966 | Lindquist | 340/172.5 |
| 3,290,659 | 12/1966 | Fuller et al. | 340/172.5 |
| 3,320,594 | 5/1967 | Davies | 340/172.5 |
| 3,388,381 | 6/1968 | Prywes et al. | 340/172.5 |
| 3,391,390 | 7/1968 | Crane et al. | 340/172.5 |

*Primary Examiner*—Paul J. Henon
*Assistant Examiner*—Sydney R. Chirlin
*Attorneys*—Hanifin and Jancin and Douglas R. McKechnie

ABSTRACT: Three associative stores are interconnected to provide a data processor. A control store contains a microprogram and it emits tags that select a function table in a working store and data from a local store, the data being applied to the working store as a look-up argument. The local store may also hold a macroprogram. Two of the stores are interconnected so that a tag emitted by one is used to address the other and vice versa. A nonassociative main store may be connected to the local store.

| ARGUMENT | | | OUTPUT | |
|---|---|---|---|---|
| TAG | A | B | | |
| X 1 | 1 X X X | 1 X X X | 1 0 0 0 | |
| X 1 | X 1 X X | X 1 X X | 0 1 0 0 | A B |
| X 1 | X X 1 X | X X 1 X | 0 0 1 0 | |
| X 1 | X X X 1 | X X X 1 | 0 0 0 1 | |
| 1 X | 1 X X X | 0 X X X | 1 0 0 0 | |
| 1 X | X 1 X X | X 0 X X | 0 1 0 0 | $A\ \overline{B}$ |
| 1 X | X X 1 X | X X 0 X | 0 0 1 0 | |
| 1 X | X X X 1 | X X X 0 | 0 0 0 1 | |
| 1 X | 0 X X X | 1 X X X | 1 0 0 0 | |
| 1 X | X 0 X X | X 1 X X | 0 1 0 0 | $\overline{A}\ B$ |
| 1 X | X X 0 X | X X 1 X | 0 0 1 0 | |
| 1 X | X X X 0 | X X X 1 | 0 0 0 1 | |

| LOCAL STORE | TAG | DATA 1 | | DATA 0 |
|---|---|---|---|---|
| 1 0 1 0 X | 1 0 1 0 | X X X X | X X X X | |
| 2 0 1 0 X | 0 1 0 0 | X X X X | X X X X | I C 3 |
| 3 0 0 1 X | 0 1 0 0 | IC1 | | I C 2 |

INVENTORS
PETER A. E. GARDNER
MICHAEL H. HALLETT
ROGER J. LLEWELYN
PETER J. TITMAN
BY Douglas R McKechnie
ATTORNEY

ASSOCIATIVE MEMORY DATA PROCESSOR

BACKGROUND OF THE INVENTION

This invention relates to an electronic data processing system.

Current electronic data processing systems frequently employ control stores storing sequences of microinstructions or like control words by means of which the system is caused to execute data processing functions. Usually, a control store is a read-only store and the response of the store, and the action it initiates by the control words it emits, to any given stimulus is limited. It has been proposed that a control store contain changeable information, but the difficulty of effecting the changeover using present day system control techniques restricts the use of the facility to well-defined occasions, such as the introduction of a new kind of order word or instruction into the system or on startup. Frequently, a changeable control store is used merely as an auxiliary control store to a read-only store.

SUMMARY OF THE INVENTION

The present invention has for object the provision of a more flexible control store arrangement.

According to the invention, there is provided an electronic data processing system including an associative control store having a plurality of word storage locations each including a working store tag field and a control store identifying tag field, and an associative working store having a plurality of word storage locations each including a working store identifying tag field and first working store data field, the system comprising a control store operation control means and a working store operation control means, the working store operation control means being selectively operable to cause comparison of the contents of the working store tag of a word from the control store with the contents of the working store identifying tag fields, and the control store operation control means being selectively operable to cause comparison of the contents of the first working store data field of a word read from the working store with the contents of the control store identifying tag fields.

It will be noted that each of the two stores emits an address, a tag enabling accessing of the contents of the other store. The invention as above defined is capable of very general application, but it has been found that by introducing a third store an electronic data processing system, performing the functions of what are known as computers, is provided.

Accordingly, another aspect of the invention provides an electronic data processing system including an associative control store, an associative working store and an associative local store, wherein the control store stores control words, each including working store and local store tags whereby data storage locations in working store and local store are selected for access, wherein the working store stores function tables whereby arithmetic and/or logical functions can be performed by table look-up procedures, and wherein the local store stores operands on which arithmetic and/or logical functions are to be performed, the interconnections between the associative stores being such that when a control word is read from the control store, the working store and local store tags in the control word cause accessing of a particular function table and particular operands respectively, the particular operands being applied to the working store to cause accessing of the entry or entries in the accessed function table appropriate to the operands.

An electronic data processing system according to this aspect of the invention has a major advantage over conventional systems, in that the hardware can be of uniform construction throughout the system. A conventional system requires much special purpose hardware. It usually comprises a gating complex of which any particular gate is only used in a few of the many operations the system can perform. Special purpose counters and registers are also usually necessary. A computer comprising a data processing system according to the invention can consist of a number of stores all identical in construction. There are clearly advantages in this arrangement from the point of view of manufacture and maintenance.

The invention will be hereinafter further described, by way of example, with reference to the accompanying drawings, in which.

DESCRIPTION

Figures 1, 3, 5:
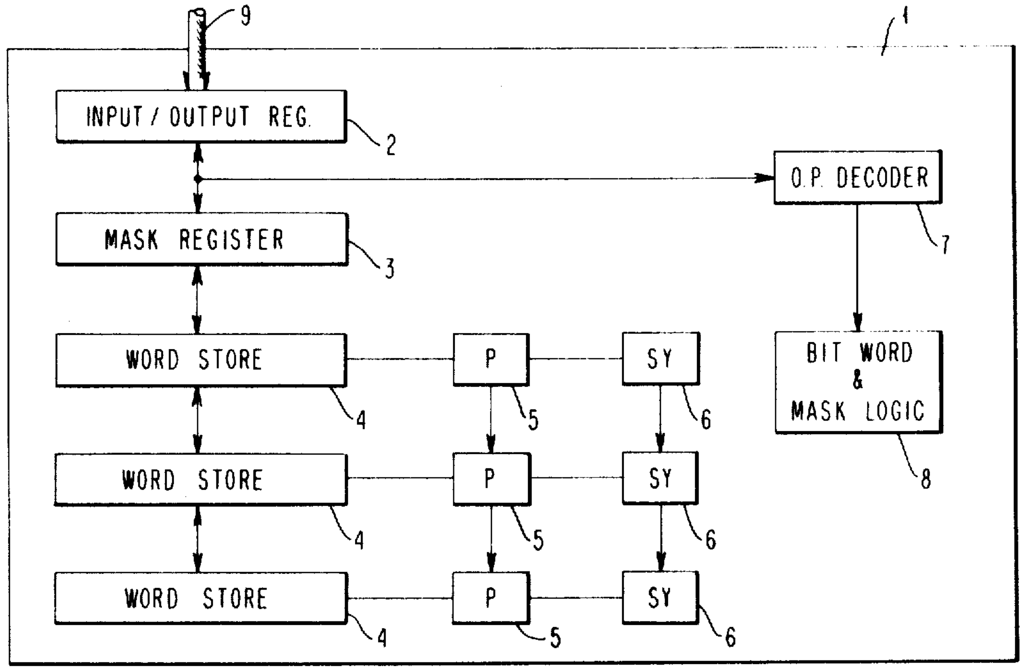
FIG. 1 shows, schematically, an associative store for use in a system according to the invention.
FIG. 3 is an example of a function table.
FIG. 5 is an instruction counter function table.

The associative store 1 (FIG. 1) has been described and claimed in the specification Ser. No. 825,455, filed Oct. 23, 1968, by P. A. E. Gardner et al. for "Associative Memory," assigned to the assignee of the present application, and will only be described herein in general terms. The store comprises an input/output register 2, a mask register 3 and a plurality of word stores 4. Each word store has a primary (P) selector trigger 5 and a secondary (Sy) selector trigger 6. Certain orders of the contents of the input/output register are decoded in operation decoder 7 to control the bit, word and mask logic circuitry 8. As is usual in an associative store, the basic operation consists in searching for word stores having contents in predetermined orders which match the contents of the same orders of the input/output register and then using the results of the search to control transfer of data between the input/output register and the word stores. The predetermined orders are selected by means of the mask register 3. The word stores containing data which match the contents of the input/output register are marked by setting a selector trigger belonging to the word store and the set trigger is used in controlling the subsequent data transfer.

The associative stores used in the data processing system to be described have several modifications over a typical prior art store. Each word store has two selector triggers 5, 6, and a search operation may result in either the primary selector triggers of matching word stores being set or alternatively the secondary selector triggers being set. An operation called "-Next" is provided whereby the setting of either each primary or each secondary selector trigger is transferred to the primary or secondary trigger respectively of the adjacent word store remote from the input/output register. Only two masks are provided, i.e., only two sets of predetermined orders of the input/output register can be chosen from comparison with the contents of the same orders of the word store. The option of using no mask is also available. Each cycle of operation of an associative store is divided into two subcycles in the first of which a search operation and/or the Next operation is performed, and in the second of which the data transfer takes place. If more than one word store is found to match the contents of the input/output register 2, in a Write operation the orders of the register 2 which were not used in the search are written into each matching word store, while in a Read operation the contents of the same orders are written together into the input/output register in what is effectively an OR operation on the matching words. At the same time as a Read or Write operation the contents of the input/output register 2 are made available on a bus 9.

Of the 72 possible combinations of operations available in the associative store of FIG. 1, 16 are used in the processing system to be described. The search operation for matching words is herein called a Select (S) operation. The basic operations are identified as follows:

S—Select
N—Next
R—Read
W—Write
0—No Mask
1—Use Mask 1
2—Use Mask 2
P—Use primary selector trigger
Sy—Use secondary selector trigger.

The sixteen combinations are as follows:

| Operation: | | | | | |
|---|---|---|---|---|---|
| 0 | S | N | W | 2 | Sy |
| 1 | S | N | R | 0 | Sy |
| 2 | S | ...... | W | 2 | Sy |
| 3 | S | ...... | R | 2 | Sy |
| 4 | S | N | W | 1 | Sy |
| 5 | S | N | R | 1 | Sy |
| 6 | | N | R | 1 | Sy |
| 7 | No operation | | | | |
| 8 | S | ...... | R | 1 | Sy |
| 9 | S | ...... | W | 1 | Sy |
| A | | N | W | 1 | P |
| B | | N | R | 0 | P |
| C | | N | R | 0 | Sy |
| D | | N | R | 1 | P |
| E | S | ...... | W | 1 | P |
| F | S | ...... | R | 1 | P |

Each operation is identified by the number or letter listed in the leftthand column. For an operation to be performed, the number or letter is presented to the operation decoder 7 in the form of a 4-bit signal. Some typical operations are now described.

Operation 0: Select, Next, Write, Mask 2, Secondary.

The search is performed over the field of the word defined as tag by mask 2. The secondary selector triggers of those words next to matching words are set. The field of the input/output register not used in the Select operation is written into those words with set secondary trigger and is also output onto the bus 9.

Operation 1: Select, Next, Read, No Mask, Secondary.

Since there is no mask the full width of the input/output register is compared with the full width of all the word stores. The secondary selectors next to matching words are set and the contents of the word stores with secondary selector set are OR-ed into the input/output register and the bus.

Operation 6: Next, Read, Mask 1, Secondary.

There is no Select operation. The setting of each secondary selector trigger is transferred to the next secondary selector trigger. The field defined by Mask 1 of all word stores with the secondary selector triggers set is read to the input/output register.

Although a data processing system according to the invention is possible using only binary storage cells in the associative stores, in the example of a system to be described the storage cells are three-state associative cells. Besides assuming stable states representing binary 0 and binary 1 and responding with match or mismatch indications to interrogation signals representing 0 and 1, the three-state cells are also capable of assuming an X or "don't care" state in which the cell responds with a match indication whatever the interrogation signal may be. Suitable forms of three-state cell have been described in the specification accompanying our copending application, Ser. No. 740,939, filed June 28, 1968, by P. A. E. Gardner et al., for "Data Storage Cell," and assigned to the assignee of the present application.

Figure 2:
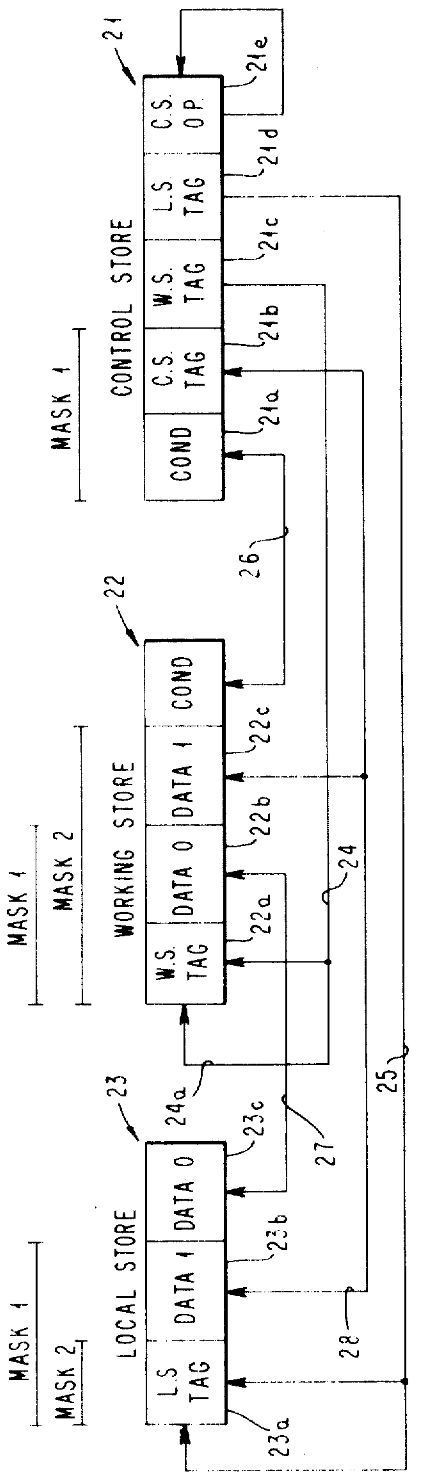
FIG. 2 is a block diagram of an electronic data processing system according to the invention.

FIG. 2 is a diagrammatic representation of a stored-program electronic computer comprising an electronic data processing system according to the invention. The Figure shows three associative stores, a Control Store 21, a Working Store 22 and a Local Store 23. The blocks representing the stores are subdivided into fields into which each word in the store is subdivided. As will be described data transfer buses interconnect certain of the fields of different stores. Data is generally represented in the computer as binary-coded decimal digits each comprising four bits. Although in practice each digit also comprises a parity bit, to avoid unnecessary complication reference to this bit is omitted in the description.

The Local Store 23 is six digits wide, each word comprising a Local Store Tag field *23a* of two digits, a Data 1 field *23b* of two digits, and a Data 0 field *23c* of two digits. Two masks are used in the Local Store 23. Under Mask 1, a Select operation takes place by matching data in the Local Store Tag and Data 1 fields, and data transfer takes place over the Data 0 field. Under Mask 2, a Select operation takes place over the Local Store Tag field and data transfer over the Data 1 and Data 0 fields.

The Working Store 22 is seven digits wide, each word comprising a Working Store Tag field *22a* of two digits, a Data 0 field *22b* of two digits, a Data 1 field *22c* of two digits and a Condition Code field *22d* of one digit. There are two masks. Under Mask 1, a Select operation takes place over the Working Store Tag and Data 0 fields and data transfer over the Data 1 and Condition Code fields. Under Mask 2, a Select operation takes place over the Working Store Tag, Data 0 and Data 1 fields and data transfer over the Condition Code.

The Control Store 21 is eight digits wide and each word comprises a Condition Code field *21a* of one digit, Control Store, Working Store and Local Store Tag fields, *21b*, *21c* and *21d* respectively, each of two digits and a Control Store Operation field *2/e* of one digit. The Control Store 21 has only one mask, Mask 1, under which a Select Operation takes place over the Condition Code and Control Store Tag fields.

In all stores the option is available of not using a mask, that is, of doing a Select operation over the whole width of a word and performing a data transfer over the whole width of a word. This operation is invariably performed in conjunction with a Next operation in Operations 1, B, C, listed above. That is, a match is made with a word and the next word to the matched word is accessed.

Data transfer buses 24 to 27 connect respectively the Working Store Tag fields of the Control and Working Stores, the Local Store Tag fields of the Control and Local Stores, the Condition Code fields of the Control and Working Stores, and the Data 0 fields of the Local and Working Stores. Data transfer bus 28 connects the Data 1 fields of the Local and Working Stores and the Control Store Tag field of the Control Store.

A stored program electronic computer should have the capability to perform arithmetic or logic operations in response to instructions stored in the computer. This involves, for efficient working, the capability to handle branch instructions and more particularly the capability to branch to a subroutine of instructions and to return to the main stream of instructions at the end of the subroutine. In the description which follows attention will be concentrated on these three capabilities.

The computer shown in FIG. 2 is a microprogrammed computer, i.e., the execution of a macroinstruction such as ADD or EDIT is initiated and performed under the control of a set of microinstructions which each define a more elementary operation and the operand or operands on which the operation is to be performed. A description of a conventionally organized microprogrammed electronic computer is given in U.S. Pat. No. 3,400,371.

In brief, the computer of FIG. 2 operates as follows. Control Store 21 contains microinstruction sequences, Working Store 22 contains function tables and Local Store 23 contains macroinstructions and data. A macroinstruction is interpreted to select a sequence of microinstructions. Each microinstruction contains a Working Store Tag which forms at least part of the argument for accessing a particular function table in the working store. The Working Store Tag may, for example, define the tag of the ADD table. In general, the remainder of the argument represents the operands and is supplied from the Local Store.

For example, the Data 0 field of the Local Store may contain a pair of digits to be added, which when transferred to the Working Store and combined with the Working Store Tag, will provide a search argument which selects the line or lines of the ADD table containing the sum of the two digits. The result of the table lookup operation is read into the Working Store input/output register and transferred to Local Store.

Considering the function tables in more detail, each table consists of an array of lines, each line comprising one or more storage locations of the store and consisting of an argument and a data portion In a table lookup operation, the argument of each line is compared with a search argument placed in the input/output register. The data portions of those lines which have arguments matching the search argument are read simultaneously to the input/output register Because a bit storage location can assume the X or "don't care" state, it is possible for lines with different arguments to be selected by a single search argument. Thus, a search argument 11 selects those lines of which the arguments are, respectively, XX, X1 and 1X, and 11. With the Working Store masks shown in FIG. 2 a line may have an argument comprising the Working Store Tag and Data 0 fields, or the Working Store Tag, Data 0 and Data 1 fields. The argument may also be the full width of Working Store, when a Select No Mask operation is used. In this latter case, the data portion of the line is located in the next word storage location and the table lookup operation consists of the Select, Next, Read, No mask operation, Operation 1. If the data portion of a line is too long to be accommodated alongside the argument in a single word location the Next facility of the Working Store is used and Operation 5 is used.

Another use of the No Mask and Next operations is when data is to be emitted from the same field as the search argument.

A function table for AND, OR or EXCLUSIVE-OR operations is shown in FIG. 3. The table gives the result of these operations on two 4-bit digits A and B. Each line of the table is accommodated in a single word store and the entries in the table represent the states 1, 0 or X, of the storage cells comprising the word store. Assume that the A digit to be operated on is 1001 and the B digit is 1010. In using the table a mask is employed which causes a Select operation on the leftmost 10 columns of the table, the argument, and data transfer, in fact Read, on the rightmost four columns, the data output field. To perform an AND operation the search argument is 01 1001 1010. The left two digits of the argument select only the first four lines of the table since the 1 bit in the remaining eight lines causes a mismatch in these word stores. It will be recalled that a cell in the X state responds with a match indication whatever the interrogation signal may be so that the presence of a 0 bit in the leftmost tag position does not cause a mismatch in the first four word stores. The four selected lines of the table each detect the presence of 1 bits in corresponding orders of the A and B digits and are selected if and only if the corresponding digits are both 1. The output field is a 1 bit in the order of the digit assigned to the line, and 0 in the remaining orders. As the result of the Select operation only the word store containing the first line of the table indicates a match by setting the required selector trigger, primary or secondary, and the resultant output to the input/output register is 1000.

For an EXCLUSIVE-OR operation, the search argument is 10 1001 1010. Due to a 1 bit in the second column of the table, the first four lines are not selected and the remaining eight lines detect the presence of complementary bits in corresponding orders of the A and B digits. Matches occur in the word stores containing the eighth and 11th lines of the table, the respective output fields being 0001 and 0010. Since a Read operation consists of OR-ing output data from selected stores, the result appearing in the input/output register is 0011.

Finally, for an OR operation, the search argument is 11 1001 1010 of which the left 2 bits select all 12 lines of the table. The first, eighth and 11th lines are selected by the remaining bits of the tag giving output data fields of 1000, 0001, and 0010, and the result in the input/output register is 1011.

In order to describe the operation of the computer of FIG. 2 it will be assumed that the Control Store 21, Working Store 22 and Local Store 23 have been loaded by some conventional process with microprograms, function tables and macroinstructions with data, respectively. Further, it is arranged that the operation codes of macroinstructions are aligned in the Data 1 field of the Local Store. Macroinstructions are sequentially stored in the Local Store, the first having a predetermined Local Store Tag, and on startup of the computer a start microinstruction sequence is selected which accesses the first macroinstruction and causes the Data 1 field to be applied to the Control Store as a search argument to be compared with the Control Store Tags of the microinstructions. The start microprogram calls for the operation F: Select, Read, Mask 1, Primary, which selects the first instruction of the microprogram for the operation to be performed and causes readout to the Control Store input/output register of the Working and Local Store Tags and the Control Store operation code. The Working Store Tag is transferred over bus 24 to the Working Store input/output register and determines the function table in the store to be used in the operation. When a table is constructed, the most appropriate operation to be performed in using the table can be predetermined. For example, a table by means of which a shift operation is performed can be so constructed that using the table involves operation 3: Select, Read, Mask 2, Secondary. One of the argument digits identifying the table is chosen to be 3 and when the search argument is placed in the input/output register for the table to be accessed, the digit 3 is decoded by operation decoder 7 (FIG. 1) to determine the operation to be performed. Accordingly, the argument identifying the table can also be used in determining the operation to be performed. In fact, each table in the Working Store is identified by two digits of which the first is decoded to give the operation to be performed in using the table. This strategem is represented in FIG. 2 by the arrow 24a leading from the bus 24 to the side of the block representing the Working Store.

The Local Store Tag is transferred over bus 25 to the Local Store input/output register and identifies one or more word stores containing data for use in the operation to be performed. As in the Working Store, the Local Store Tag contains information about the operation to be performed in the Local Store. A modification of the stratagem used in the Working Store is necessary since in the Local Store it is not, in general, possible to associate only one operation with a particular word storage location. It is necessary to be able to transfer data both into and out of most word storage locations in the Local Store. Two typical operations are Operation 2, Select, Write, Mask 2, Secondary, which is called for by the binary-coded digit 0010, and Operation 3, Select, Read, Mask 2, Secondary, which is called for by the binary-coded digit 0011. A word storage location having an argument digit 001X is selected by either tag 0010 or tag 0011 so that either reading or writing can be effected on the word store.

The data selected in Local Store as a result of the input of the Local Store Tag is transmitted to the Working Store to complete the search argument. The data output from the Working Store is transferred over buses 27 and 28 usually to the Local Store.

Having completed the first operation of a microinstruction sequence the succeeding microinstructions are each emitted from the Control Store by Operation D: Next, Read, Mask 1: the Local Store and Working Store Tags in the next word storage location to the one in which the preceding microinstruction was stored is read onto the output buses. It is thus clear that a sequence of microinstructions stored in successive word storage locations of the Control Store can be executed by the computer of FIG. 2.

In order to branch from a sequence of microinstructions, the method of selection of the microinstruction to be executed is changed so that the selection is dependent on machine conditions. This is effected by performing a Select operation on the Control Store while ensuring that the search argument reflects machine conditions. The microinstruction next before a branch is emitted from the Control Store by Operation A: Next, Read, No Mask, Primary, which results in the Control Store Tag appearing in the Control Store input/output register. It is arranged that the Data 1 outputs from Working and Local Stores are known or are made predictable. For example, a check that an arithmetic operation has been correctly performed in Working Store may be caused to result in one of two predetermined outputs in the Working Store Data 1 field. The Condition Code in the Working Store is transferred over bus 26 to the corresponding orders of the Control Store input/output register. The Control Store operation called for by the microinstruction just mentioned is Operation F: Select, Read, Mask 1, Primary, which results in a selection of the microinstruction matching the contents of the Condition Code and Control Store Tag field of the Control Store input/output register. If, as will usually be the case, it is assumed that the Data 1 fields are all zero, since Control Store Tag is predetermined, the search argument is seen to depend on the contents of the Condition Code which consists of a single 4-bit digit and may thus take any of 16 values. A 16-way branch is therefore possible.

The use of the Condition Code will not be described in detail since it is a device well known in data processing systems. The Condition Code is used to indicate some data or machine condition arising out of a data manipulation. The code may, inter alia, indicate which of two operands is the larger, or if overflow has arisen as the result of an addition. The particular meaning to be given to a given Condition Code digit depends, in general, on the operation which has just been performed. The same Condition Code digit may mean that the value of the Data 1 field is greater than the Data 0 field, or may mean, in a different context, that overflow has taken place.

Since the Working Store is where the function tables are stored, conditions determining a branch most frequently arise as a result of operations in the Working Store, but it is sometimes desirable to branch on signals derived from the Local Store. This is done by arranging that certain bits of the Control Store Tag to be used in selecting the branching microinstruction are zero, and that the values of corresponding bits in an otherwise all-zero Data 1 field of the Local Store reflect the condition determining the branch. The Data 1 field is read out to the bus 28 into the Control Store input/output register at the same time as the Control store Tag. The Tag field used in selecting the succeeding microinstruction is thus dependent on signals from the Local Store.

The provision of primary and secondary selector triggers enables a ready incorporation of microprogram subroutines into the data processing system. The main program microinstructions are selected by setting the primary selector trigger and when it is required to branch to a subroutine the Operation 8: Select, Read, Mask 1, Secondary, is used. The set primary selector trigger identifying the last microinstruction used is not affected and selection of the next microinstruction to be used is made by setting the secondary trigger of the word storage location containing this microinstruction. Subsequent microinstructions are selected by using Operation 6: Next, Read, Mask 1, Secondary, which causes the settings of the secondary triggers to be transferred to the secondary triggers of the next word storage locations. In this way the subroutine is executed. The last operation of a subroutine is Operation D: Next, Read, Mask 1, Primary. The Next operation causes the state of each primary selector trigger to be transferred to the primary selector trigger of the next word storage location. Since the only primary selector trigger set is that associated with the last-used microinstruction of the main program, the effect of the operation is to read out the next microinstruction of the main program.

Since a branch to a subroutine is the same, in principle, as the branching operation described above, a branch to a subroutine can be made with the same options as a branch. That is, the branch may be unconditional or as the result of tests or other conditions in the Local or Working stores. The only difference is that the use of secondary selector triggers enables the retention of a link, by way of the primary selector triggers, with the main program.

Macroinstructions are stored in the Local Store and are accessed sequentially by using the Next, Read, Primary operation. It is arranged that all other word storage locations of the Local Store are accessed by using the secondary selector triggers but that macroinstructions are accessed using the primary selector triggers as pointers in much the same way that subroutines are accessed in the Control Store. Macrobranch instructions are executed in the same way as microbranch instructions although the Condition Code is not used in determining whether a branch is to be made.

Figure 4:
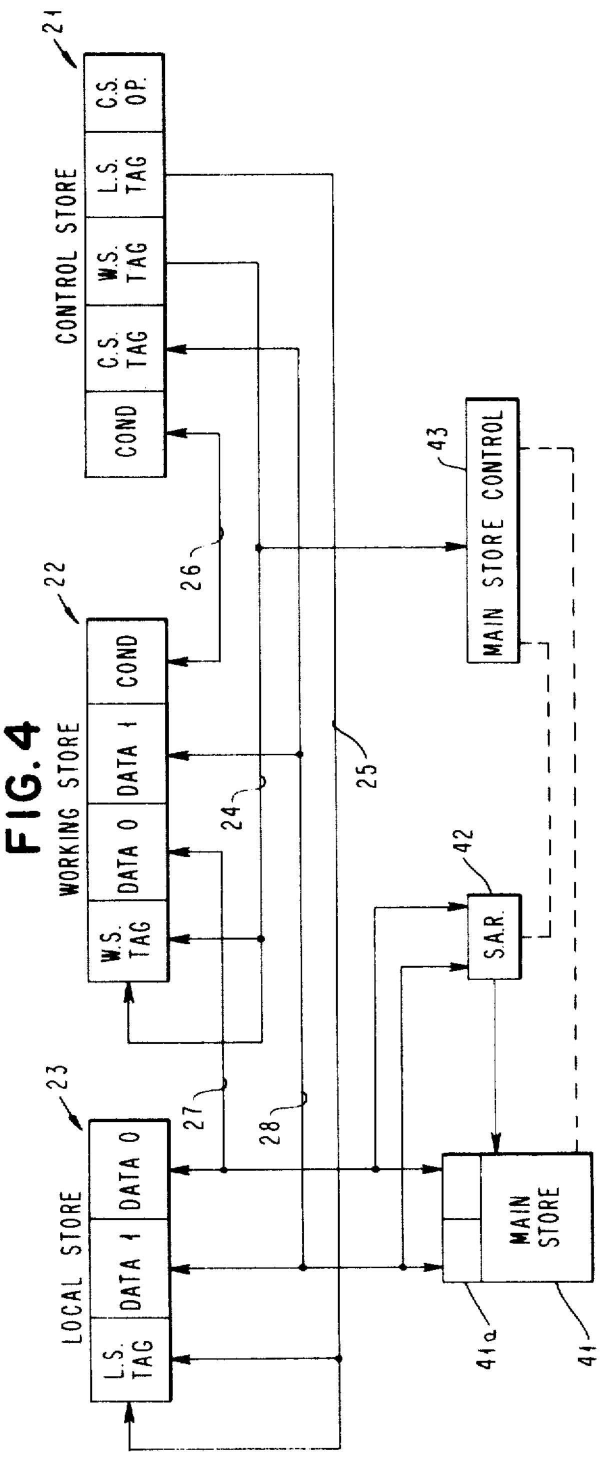
FIG. 4 is a block diagram of another electronic data processing system according to the invention.

In an alternative embodiment shown in FIG. 4, macroinstructions are stored in a conventional core store, referenced as main store 41, having a storage address register 42. Other components are as described with reference to FIG. 2 and have the same reference numerals. Communication between the associative system and main store 41 is effected by connecting the buses 27, 28 to the main store 41, more particularly to a main store buffer 41*a*, and the storage address register 42. Control of main store is effected by main store control 43 which is responsive to predetermined Working Store tags which are applied to control 43 over bus 24.

Control Store Tags cause the following main store functions: Load Data 1 and Data 0 fields in the storage address register 42; and Transfer data between the Data 1 and Data 0 fields and buffer 41*a*. In the event of an address or other error, main store 41 is caused to emit, by way of buffer 41*a* and bus 28, a control store tag which causes the system to enter a diagnostic routine.

In contrast with the system described with reference to FIG. 2, local store 23 of FIG. 4, instead of storing the macroinstructions, now stores an instruction counter table the output of which is used as input to the storage address register to select the next macroinstruction. The table is shown in FIG. 5 and illustrates a general case where the area of main store used for storing macroinstructions is defined by a variable high-order 8-bit byte IC1, and variable low order 8-bit bytes IC2 and IC3. Lines 1 and 2 of the table include a tag bit 010X which implies that these lines can be accessed by the Operations 4 or 5: Select, Next, Write or Read, Mask 1, Secondary. If the byte 0101 1010 is in the Local Store Tag field of Local Store input/output register, line 1 of the table is selected—it is immaterial what is in the Data 1 field of register—and the Next operation results in the secondary selector trigger of line 2 of the table being set. Under Mask 1, the address byte IC3 is read out to the input/output register. If the write operation is used address byte IC3 is written into the Data 0 field of line 2 of the table. In the same way, using a Local Store tag 0101 0100 or 0100 0100, byte IC2 in line 3 of the table is accessed. If the tag field of the Local Store input/output register contains the byte 0011 0100, the Operation 3: Select, Read, Mask 2, Secondary results in the address bytes IC1 and IC2 being transferred from line 3 of the table to the Local Store input/output register. A tag field 0010 0100 results in the IC1 and IC2 bytes being transferred from the input/output register to line 3 of the table.

The increment to be added to the low-order byte IC3 of the instruction address is taken from a three-line table in Working Store. The Working Store tag field of each entry of the table includes the Working Store operation digit 1000 which defines the Operation 8: Select, Read, Mask 1, Secondary, and causes the transfer of the contents of the Data 1 field to the Working Store input/output register. The Data 1 fields of the table contain the most commonly required increments. For example, the table may provide for increments of +1, +2, or −1.

If the increment table in Working Store is accessed simultaneously with the instruction counter table in local store the result is byte IC3 on bus 27 and an increment on bus 28. The addition table in Working Store is then used to increment byte IC3 and the incremented byte is returned to line 2 of the instruction counter table. An overflow out of byte IC3 is used to bring in a subroutine which accesses line 3 of the instruction counter table and the increment +1 from the increment table in Working Store These are added, using the addition table in Working Store, to give the incremented byte IC2

In summary, there has been described a computer comprising a data processing system in which arithmetic and logical operations are performed on operands by means of table lookup procedures selected by a stored program of microinstructions. Many variations of the basic system may be constructed. For example, the system may comprise only a Working Store and a Control Store, the former store also containing data and macroinstructions. Alternatively, the system may be used to process data in real time, providing, for example, an interface between a data transmission line and a large-scale data processing system. Data arriving over the transmission line may be buffered in Working Store, and be checked and edited under the control of microprograms in the Control Store, before being transferred to the large-scale system.

In the particular embodiments described it is not necessary that the Control Store be fully associative. It can be arranged that only Mask 1 is used in the Control Store with the option of not using the mask not being available. In this case it is only necessary that the Condition and Control Store Tag fields have the associative property. If the data cell described in the specification of our copending application, Ser. No. 740,939, mentioned above, is used, each bistable circuit of the cell can be used to store a different bit of the remaining Tag and Operation fields of the Working Store, thereby halving the hardware necessary to store these fields.

Although in the drawings the various associative stores have been shown as physically separate, it may in certain circumstances be found convenient to package two or more stores in a single hardware associative store. For example, the Working and Control Stores could be incorporated in a single store 15 digits wide, instead of two stores which are seven and eight digits wide, respectively.

While the invention has been particularly shown and described with reference to preferred embodiments thereof, it will be understood by those skilled in the art that the foregoing and other changes in form and details may be made therein without departing from the spirit and scope of the invention.

What we claim is:

1. An electronic data processing system including: an associative control store having a plurality of word storage locations each including a working store tag field and a control store identifying tag field; an associative working store having a plurality of word storage locations each including a working store identifying tag field and first working store data field; working store operation control means for selectively causing comparison of the contents of said working store tag field of a word from said control store with the contents of said working store identifying tag fields; and control store operation control means for selectively causing comparison of the contents of said first working store data field of a word read from said working store with the contents of said control store identifying tag fields.

2. A system as claimed in claim 1 including: an associative local store having a plurality of word storage locations each including a local store identifying tag field and a first local store data field; each word storage location of said control store further having a local store tag field; and a local store operation control means for selectively causing comparison of said local store tag field of a word read from the control store with the contents of said local store identifying fields.

3. A system as claimed in claim 2 wherein said working store operation control means includes means for selectively causing comparison of the contents of said first local store data field of a word read from said local store with the contents of said first working store data fields.

4. A system as claimed in claim 2 wherein said local store operation control means includes means for selectively causing comparison of the contents of said first working store data field of a word read from said working store with the contents of said first local store data fields.

5. A system as claimed in claim 2 wherein each word storage location of said working store has a second working store data field, and each word storage location of said local store has a second local store data field; and said working store operation control means includes means for selectively causing comparison of the contents of said second local store data field with the contents of said second working store data field.

6. A system as claimed in claim 1 wherein each word storage location of each associative store comprises a plurality of associative binary data storage cells which are each constructed so as in operation to emit a match or a mismatch signal according as to whether the binary data stored by the cell is the same as or differs from, respectively, the binary data represented by an interrogation signal applied to the cell, wherein each storage cell has a storage state in which a match signal is emitted by the cell, whatever is the binary data represented by an interrogation signal.

7. A system as claimed in claim 1 wherein each storage location of said control store has a control store data field and each storage location of said working store has a third working store data field, said control store operation control means including means for selectively causing comparison of said third working store data field of a word read from said working store with the contents of said control store data fields.

8. A system as claimed in claim 1 wherein each word storage location of each associative store has a respective selector trigger which is set to a predetermined stable state to enable the data storage location to be accessed.

9. A system as claimed in claim 8 wherein the word storage locations are arranged side-by-side, and the operation control means of each associative store is operative to transfer the state of the said selector trigger to the selector trigger of the adjacent word storage location in a predetermined direction.

10. A system as claimed in claim 8, wherein each word storage location of each associative store has two or more respective selector triggers a selectable one of which is set to a predetermined stable state to enable the data storage location to be accessed.

11. A system as claimed in claim 10, wherein each associative store has two or more sets of selector triggers, each word storage location having associated therewith a different selector trigger of each set, and the word storage locations being arranged side by side, wherein the operation control means of each associative store is operable to transfer the state of each trigger of a selected set to the trigger of the same set associated with the adjacent storage location in a predetermined direction.

12. A system as claimed in claim 8, wherein each associative store is such that all word storage locations whereof the selector triggers are in the predetermined stable state are accessed simultaneously.

13. A system as claimed in claim 1 including a nonassociative data store and transfer means for transferring data between the nonassociative data store and an associative memory.

14. An electronic data processing system including an associative control store, an associative working store and an associative local store, wherein the control store stores control words, each including working store and local store tags whereby data storage locations in working store and local store are selected for access, wherein the working store stores function tables whereby arithmetic and logical functions can be performed by table lookup procedures, and wherein the local store stores operands on which arithmetic and logical functions are to be performed, means interconnecting said associative stores so that when a control word is read from the control store, said working store and local store tags in the control word cause accessing of a particular function table and particular operands respectively, the particular operands being applied to said working store to cause accessing of the entry or entries in the accessed function table appropriate to the operands.

15. A system as claimed in claim 14 including a nonassociative data store, including means for transferring data between the data store and the local store, wherein the local store stores an address operand representing a memory address in the data store and the working store stores a function table or tables for incrementing or decrementing the address operand.